(12) United States Patent
Schuck (10) Patent No.: US 9,164,365 B2
(45) Date of Patent: Oct. 20, 2015

(54) IMAGING PATH SPECKLE MITIGATION

(71) Applicant: REALD INC., Beverly Hills, CA (US)

(72) Inventor: Miller H. Schuck, Erie, CO (US)

(73) Assignee: RealD Inc., Beverly Hills, CA (US)

( * ) Notice: Subject to any disclaimer, the term of this patent is extended or adjusted under 35 U.S.C. 154(b) by 165 days.

(21) Appl. No.: 13/667,878

(22) Filed: Nov. 2, 2012

(65) Prior Publication Data

US 2013/0113788 A1    May 9, 2013

Related U.S. Application Data

(60) Provisional application No. 61/557,223, filed on Nov. 8, 2011.

(51) Int. Cl.
| | |
|---|---|
| *G06T 15/00* | (2011.01) |
| *G03B 21/20* | (2006.01) |
| *G02B 27/48* | (2006.01) |
| *G03B 21/14* | (2006.01) |
| *G02B 13/00* | (2006.01) |
| *G02B 27/09* | (2006.01) |
| *G03B 35/26* | (2006.01) |
| *G02B 26/08* | (2006.01) |
| *H04N 13/04* | (2006.01) |

(52) U.S. Cl.
CPC ........ *G03B 21/2033* (2013.01); *G02B 13/0095* (2013.01); *G02B 27/0933* (2013.01); *G02B 27/48* (2013.01); *G03B 21/142* (2013.01); *G02B 26/0875* (2013.01); *G03B 35/26* (2013.01); *H04N 13/0459* (2013.01)

(58) Field of Classification Search
CPC ........ G02B 27/22; G02B 27/26; G02B 27/48; G03B 35/26; G03B 21/2033; G03B 21/14; G03B 35/18; H04N 13/0459

USPC ........... 345/419; 356/237.2, 237.5, 336, 364, 356/369
See application file for complete search history.

(56) References Cited

U.S. PATENT DOCUMENTS

| | | | |
|---|---|---|---|
| 5,579,171 A | 11/1996 | Suzuki | |
| 5,654,826 A | 8/1997 | Suzuki | |

(Continued)

OTHER PUBLICATIONS

Trisnadi et al, Speckle contrast reduction in laser projection displays, Proc. IEEE, vol. 4657, 2002, pp. 131-137.*
Slinger et al, Computer-Generated Holography as a Generic Display Technology, IEEE, Aug. 2005, pp. 46-53.*
Chellappan et al, Laser-based displays: a review; Optical Microsystems laboratory, Aug. 2010, pp. F79-F98.*

(Continued)

*Primary Examiner* — Phu K Nguyen
(74) *Attorney, Agent, or Firm* — Darlene K. Kondo; Neil G. J. Mothew (57) ABSTRACT

Disclosed herein are optical projection systems and related methods for projecting imagery employing shifting image position in-time to mitigate speckle. Exemplary optical systems may include a projector having a light source, a relay lens and at least one projection lens for projecting images. The relay lens or the projection lens may have at least one lens element that may be translated in-time substantially orthogonal to the optical axis of the optical system. Alternatively, the projection lens in its entirety may be shifted in-time to reduce speckle. Further, in stereoscopic embodiments, two projection lenses may be employed, wherein at least one element in each projection lens is moveable to shift the image in-time to reduce speckle. Moreover, electronic compensation, such as electronic addressing or image warping, for the image shifting may be employed to shift the image in a direction opposite to the speckle-reducing shift in position.

29 Claims, 4 Drawing Sheets

(56) References Cited

U.S. PATENT DOCUMENTS

| | | | |
|---|---|---|---|
| 5,990,983 A * | 11/1999 | Hargis et al. | 348/758 |
| 6,154,259 A * | 11/2000 | Hargis et al. | 348/756 |
| 7,055,957 B2 | 6/2006 | Troyer | |
| 7,164,961 B2 * | 1/2007 | Mei et al. | 700/121 |
| 7,301,691 B2 * | 11/2007 | O'Donnell | 359/291 |
| 7,317,578 B2 | 1/2008 | Drazic | |
| 7,611,249 B2 * | 11/2009 | Kim | 353/101 |
| 7,972,020 B2 * | 7/2011 | Bartlett et al. | 353/121 |
| 8,172,404 B2 * | 5/2012 | Silverstein et al. | 353/38 |
| 8,366,281 B2 * | 2/2013 | Silverstein et al. | 353/101 |
| 8,807,756 B2 * | 8/2014 | Mizushima et al. | 353/31 |
| 2006/0279713 A1 * | 12/2006 | Wang et al. | 353/101 |
| 2008/0198334 A1 | 8/2008 | Kasazumi | |
| 2009/0128780 A1 | 5/2009 | Schuck | |
| 2010/0165297 A1 * | 7/2010 | Mizushima et al. | 353/30 |
| 2011/0235003 A1 | 9/2011 | Konno | |

OTHER PUBLICATIONS

International search report and written opinion of international searching authority for PCT/US2012/063260 dated Mar. 11, 2013.

U.S. Appl. No. 61/507,959, filed Jul. 14, 2011, title "Compact polarization converting stereoscopic projection" by Miller Schuck (not provided as Examiner can retrieve from USPTO database).

Goodman, J. "Speckle Phenomena in Optics," (Roberts & Co. 2007).

Mandler, W. "Design of Basic Double Gauss Lenses," Proc. of SPIE vol. 0237, International Lens Design, May 1980.

Wolberg, G. "Digital Image Warping," IEEE Computer Society Press, 1990.

Caldwell, J. Brian and Betensky, Ellis I., "Compact, Wide Range, Telecentric Zoom Lens for DMD Projectors," IODC Technical Digest, 1998, p. 78.

* cited by examiner

IMAGING PATH SPECKLE MITIGATION

PRIORITY CLAIM

The present disclosure is a nonprovisional conversion of, and thus claims priority to, U.S. Provisional Patent Application No. 61/557,223, entitled "Imaging path speckle mitigation" and filed Nov. 8, 2011, which is herein incorporated by reference in its entirety.

TECHNICAL FIELD

The present disclosure generally relates to projection systems, and more specifically, to two dimensional and three dimensional projection systems and display technologies and components.

BACKGROUND

Generally, current display and projection technologies may include functionality to deploy, view and/or display three dimensional ("3D") content. Recently, the increased demand for such functionality has driven the need for enhanced performance of projection technology. Projection systems typically use arc lamps, and in one example, xenon arc sources, for cinema projection systems, as the light source. Arc lamps have brightness which degrades over time due to electrode erosion, movement in the arc position relative to the collection optics, and particle buildup on the lamp walls.

More modern light sources employ coherent light sources, such as lasers, over incoherent arc lamps. The use of coherent or partially coherent sources can have advantages in display or illumination over standard incoherent sources (lamps) in that they can achieve higher brightness, better reliability, and larger color gamut. Lasers in particular provide a brighter light source with longer lifetimes as compared typical arc lamps.

Since lasers are coherent light sources, lasers suffer from the appearance of speckle when laser light is scattered from surfaces with roughness on the order of a wavelength. Speckle forms when coherent, but differently phased, portions of the reflected beam constructively and/or destructively add inside a single resolution spot of the detector, such as a human eye. In projection systems, speckle is due to interference of the light on a display screen or target that causes variations in intensity that can be seen by the observer or an instrument. The high contrast nature of the neighboring resolution spots disrupts the spatial continuity of the image. Thus, these typically high frequency intensity variations are very undesirable for display or imaging applications. Accordingly, it would be desirable in the art to have a technique for mitigating image speckle along the optical path, without significantly affecting image quality.

SUMMARY

This disclosure provides for the reduction speckle of display systems using the shifting of image position in-time to mitigate speckle. Exemplary optical systems may include a projector having a light source, a relay lens and at least one projection lens for projecting images. To shift the image produced on a pixel panel at an intermediate image plane, a single lens element in the optical train may be translated substantially orthogonally to the optical axis. Additionally, one or more lens elements may be translated, resulting in a translation of the image at the intermediate image plane with little effect on the modulation transfer function, axial color, lateral color, and/or distortion of the image. From a mechanical implementation standpoint, shifting a single lens element may be implemented, in one specific example, by an approximate 3 um lateral shift of a lens element in the relay lens to provide approximately a half-pixel image shift for an approximately 8.5 um pixel panel. Alternatively, one or more lens elements in the projection lens may be translated in-time substantially orthogonal to the optical axis of the optical system. Furthermore, the projection lens in its entirety may be shifted in-time to reduce speckle.

In one exemplary embodiment, an optical system constructed in accordance with the disclosed principles may comprise a light source for illuminating a pixel panel, and a relay lens located in an image path generated by the light source and pixel panel for relaying an intermediate image of the pixel panel. Such an exemplary optical system may also comprise at least one projection lens for projecting intermediate imagery received from the relay lens onto a display screen, such as a projection screen. As discussed above, in such embodiments at least a portion of the relay lens or the projection lens is translatable substantially orthogonal to an optical axis of the optical system in-time to shift a position of the projected imagery on the screen thereby mitigating imagery speckle. Moreover, electronic compensation, such as electronic addressing or image warping, for the image shifting may be employed at the pixel panel to shift the image in a direction opposite to the speckle-reducing shift in position.

Furthermore, in stereoscopic embodiments, two projection lenses may be employed, wherein at least one element in each projection lens is moveable to shift the image in-time to reduce speckle. In one embodiment, a stereoscopic optical projection system constructed in accordance with the disclosed principles may comprise a laser light source for illuminating a pixel panel, and a relay lens positioned in an image path generated by the pixel panel and light source for relaying intermediate stereoscopic imagery of the pixel panel. In such embodiments, the stereoscopic optical system may also comprise first and second projection lens for projecting stereoscopic intermediate imagery received from the relay lens onto a display screen, such as a projection screen. As mentioned above, a position of the projected stereoscopic imagery on the screen is moveable in-time thereby mitigating imagery speckle. As before, electronic compensation for the image shifting may also be employed at the pixel panel to shift the image in a direction opposite to the speckle-reducing shift in position.

In other aspects, methods for reducing image speckle in accordance with the disclosed principles are provided herein. For example, exemplary methods for mitigating imagery speckle in an optical system may comprise illuminating a pixel panel with a light source, and relaying an intermediate image of the pixel panel using a relay lens positioned in an image path generated by the pixel panel and light source. Such methods may further comprise projecting intermediate imagery received from the relay lens with at least one projection lens onto a display screen. In accordance with the principles disclosed herein, such methods may also include shifting a position of the projected imagery on the pixel panel by translating at least a portion of the relay lens or the projection lens substantially orthogonal to an optical axis of the optical system in-time to thereby mitigate imagery speckle. Once again, electronic compensation for the image shifting may also be employed to shift the intermediate image at the pixel panel in a direction opposite to the speckle-reducing shift in position.

BRIEF DESCRIPTION OF THE DRAWINGS

Embodiments are illustrated by way of example in the accompanying figures, in which like reference numbers indicate similar parts, and in which.

DETAILED DESCRIPTION

Generally, lasers may provide a bright light source with longer lifetimes as compared to traditional arc lamps used in display systems. Lasers may be substantially coherent sources, and may be associated with the appearance of speckle when laser light scatters from surfaces with roughness on the order of a wavelength. Speckle may form when substantially coherent, but differently phased portions of the reflected beam constructively and/or destructively interact inside a single resolution spot of the detector, such as a human eye. The high contrast nature of neighboring resolution spots may disrupt the spatial continuity of the image. Speckle may be mitigated through several methods including, but not limited to, polarization diversity, temporal averaging, wavelength diversity, angular diversity, and temporal or spatial coherence reduction, and so forth as discussed in J. Goodman, *Speckle Phenomena in Optics*, (Roberts & Co 2007).

As discussed herein, temporal averaging of the image location may be employed at the screen to mitigate the perceived speckle. Although the examples discussed herein may employ lasers, other systems, such as arc lamp systems and LED light sources, may also have partial coherence and may produce speckle. Accordingly, LED lamp systems, arc lamps systems and arc lamp projectors may also be used in accordance with the principles disclosed herein.

Image stabilization technology may be utilized in camera systems for correcting the image location on the sensor when the camera is shaken. Image stabilization for cameras is discussed in U.S. Pat. Nos. 5,654,826 and 5,579,171, both of which are herein incorporated by reference in their entirety. As discussed herein and in accordance with the disclosed principles, image stabilization concepts, among other methods, may be applied to mitigate speckle in projection systems.

Active and passive polarization converting stereoscopic projection systems ("PCS") are generally discussed in U.S. Patent Application Publication No. US2009/0128780A1, which is herein incorporated by reference in its entirety. Additionally, compact and wider throw ratio systems are generally discussed in U.S. Provisional Patent Application No. 61/507,959, which is also herein incorporated by reference in its entirety. The compact and wider throw ratio projection systems may include at least a relay lens, polarization converting optics, and projection lenses. Further, the system may be attached to a projector, and in one example, may serve as the image forming path from a spatial light modulator, such as a DLP® micro-mirror panel, to the screen.

U.S. Patent Application No. 61/507,959 which is herein incorporated by reference in its entirety, generally describes a compact imaging path for projection that provides wide throw ratio and polarization conversion. Such a system may include a relay lens, polarization conversion optics and projection lenses. By randomly moving weakly powered elements in the relay lens or projection lens, the image position can be shifted on screen over time with little change in image quality. If the image shift is slight, such as on the order of a pixel or less, and the movement is faster than the response time of a human eye, then a lower speckle and high modulation transfer function ("MTF") image can be achieved with laser light sources.

Figure 1:
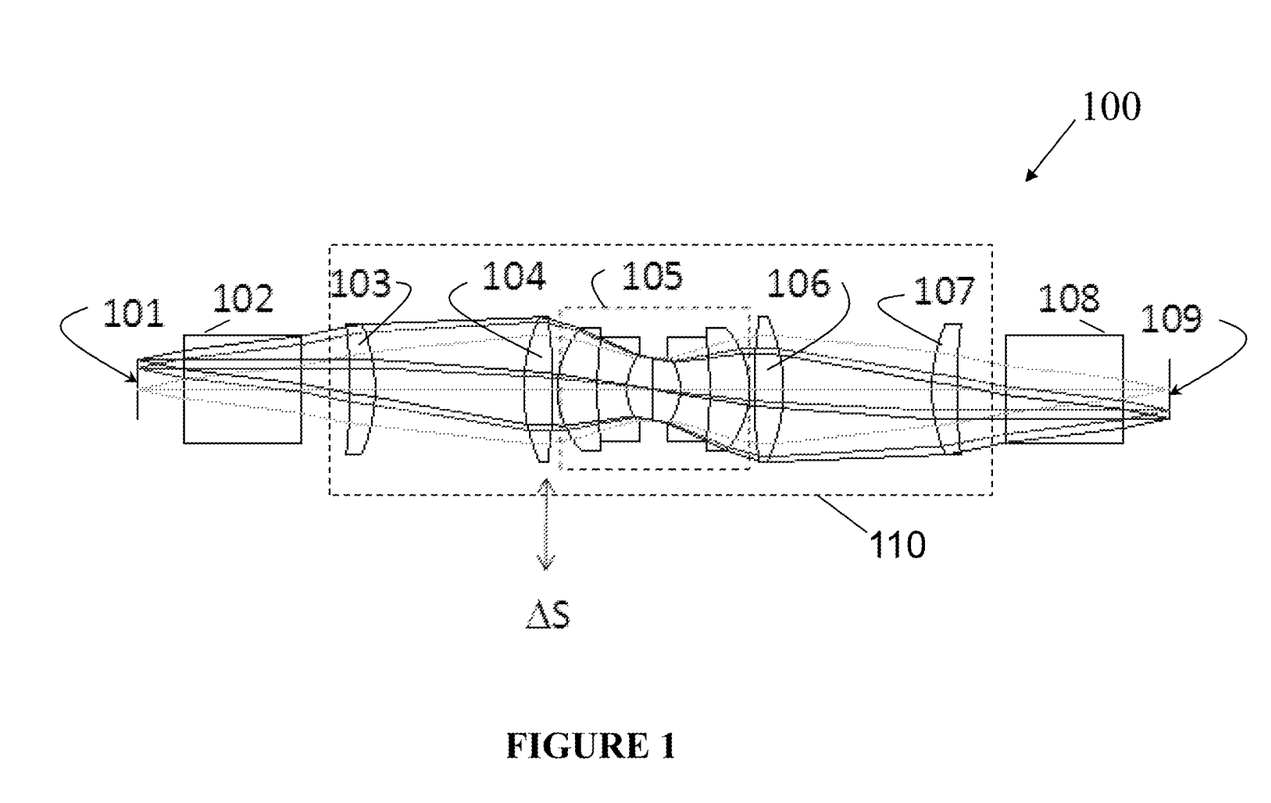
FIG. 1 is a schematic diagram illustrating one embodiment of a relay lens in accordance with the disclosed principles.

FIG. 1 is a schematic diagram illustrating one embodiment of an optical system 100 employing a relay lens system 110 constructed in accordance with the disclosed principles. Specifically, FIG. 1 is one example of a double-Gauss relay lens system 110. Double-Gauss systems may include two outer lenses and two inner cemented menisci (105), symmetrically arranged around an aperture, as discussed in *Design of Basic Double Gauss Lenses*, W. Mandler, Proc. Of SPIE Vol. 0237, International Lens Design, May 1980, which is herein incorporated by reference in its entirety. Double-Gauss systems may provide an initial value for the low f-number and long back focal length relay lenses that may be employed for projection. Departures from the typical double-Gauss design implemented in accordance with the disclosed principles may include, but are not limited to, one or more of the following: asymmetries in the power arrangements, asymmetries in glass material, air-spaced doublets, in place of cemented, addition of achromatic doublets, splitting the power of single elements into multiple elements and so forth. These departures may allow the lens designer greater freedom in correcting specific aberrations and meeting specific system needs in addition to other issues. The exemplary embodiment illustrated in FIG. 1 splits the power in the two outer lenses by providing four lenses 103, 104 and 106, 107 in pairs on opposing sides of the menisci 105, and separates the pairs with air, which is a modification of the double-Gauss lens. Although FIG. 1 illustrates an optical system, it is a schematic diagram with a lens arrangement that includes ray tracing and is illustrated as such for discussion purposes and not of limitation. Further, all the figures in this disclosure include schematic diagrams of optical systems with ray tracing.

Continuing the discussion of FIG. 1, to shift the image of pixel panel 101 at the intermediate image plane 109 using the relay lens 110, a single lens in the optical train may be translated substantially orthogonally to the optical axis. Given the size, weight and critical nature of the inner menisci 105 alignment to image quality, the menisci 105 may remain substantially stationary. One or more of the elements 103, 104, 106 or 107 may be translated, resulting in a translation of the image at the intermediate image plane 109 with little effect on the MTF, axial color, lateral color, and/or distortion of the image. For simplicity and discussion purposes, and not of limitation, a single element (104) is shown translated in FIG. 1.

From a mechanical implementation standpoint, a single lens element within the relay lens 110 may be shifted (ΔS) by a portion of a pixel size of the pixel panel 101 to provide approximately a half-pixel image shift in the intermediate imagery 109. In a more specific example, the single element 104 may be translated by an approximate 3 um lateral shift to provide approximately a half-pixel image shift for an approximately 8.5 um pixel panel. The relay lens 110 may also be paired with a projection lens or polarization conversion system and two projection lenses, as discussed in further detail below, to produce an image on-screen that may vary slightly in position with time, but may retain high image quality. Item 102 depicts the illumination and color management optics, for example glass blocks, typically employed for directing light to and from the pixel panel 101 in projection systems. Item 108 depicts the management optics, for example a block of glass, typically employed with a polarization conversion system, discussed in additional detail below. Items 102 and 108 are shown in this particular example, and may or may not be employed in the final implementation of an optical system constructed in accordance with the disclosed principles.

Additionally, the addressed image on the pixel panel 101 may be shifted in the substantially opposite direction of the lens-shifted image, which may compensate for the movement. This may maintain substantially steady pixels on-screen, while the illumination footprint may shift to reduce speckle. Full or partial-pixel shifts may be accommodated by shifts in electronic addressing or by image warping at the pixel panel 101, as generally discussed in *Digital Image Warping*, by G. Wolberg, IEEE Computer Society Press, 1990, herein incorporated by reference.

Figure 2:
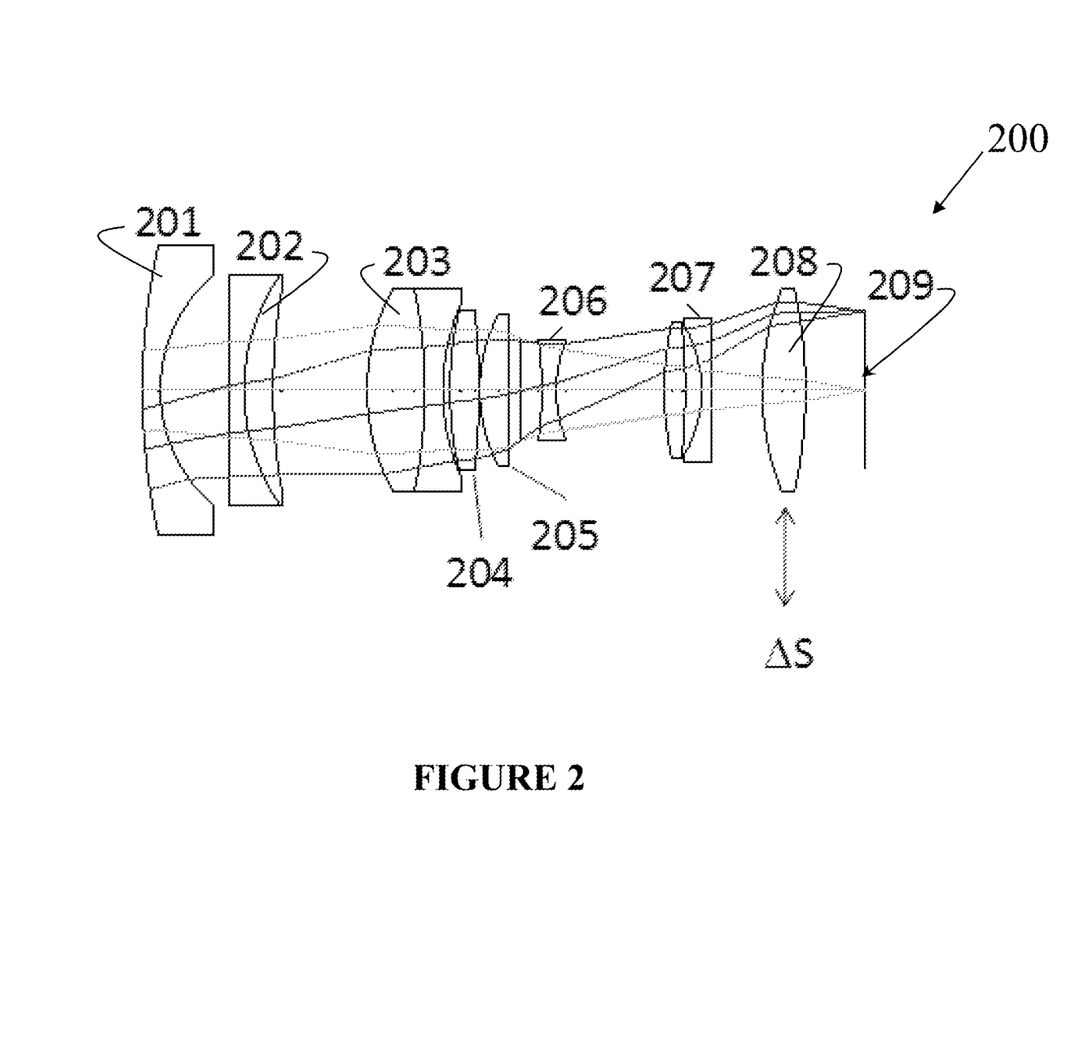
FIG. 2 is a schematic diagram illustrating one embodiment of a projection lens in accordance with the disclosed principles.

Similarly, a projection lens may include elements that may be translated substantially orthogonal to the optical axis to provide image shift on-screen. FIG. 2 is a schematic diagram illustrating one embodiment of a projection lens 200 constructed in accordance with the disclosed principles. The projection lens 200 includes a number of different lens elements 201-208 for projecting imagery on a screen (not illustrated, but would be located to the far left of element 201), and thus the projection lens 200 illustrated in FIG. 2 is similar to exemplary projection lens generally discussed in *Compact, Wide Range, Telecentric Zoom Lens for DMD Projectors*, by J. Brian Caldwell and Ellis I. Betensky, IODC Technical Digest, 1998, p. 78, herein incorporated by reference.

However, at least one or more elements in the novel projection lens 200 may be candidates for lateral shifting in accordance with the disclosed principles to reduce speckle. This results in shifting the on-screen image and also mitigating speckle. For example, element 208 residing near intermediate image 209 (for example, a real image of a pixel panel, as discussed above) may be shifted to reduce speckle. For an approximately half-pixel shift in image at the screen, an approximately 12 um displacement may be employed, assuming an approximately 8.5 um pixel pitch at the intermediate image 209.

Alternatively or additionally, other elements of FIG. 2 may be shifted. For example, element 205 may be relocated by an approximately 2 um displacement to achieve substantially the same pixel shift at the screen. Further, other elements may be shifted, but may not produce the desired effect. Doublet 203 may be relocated by an approximately 316 um displacement, which may produce a significant drop in MTF and increase in lateral color, both of which may be undesirable effects. Regardless of which projection lens element(s) is selected to be shifted, such element(s) may be selected by employing a displacement for a single pixel shift on-screen to be approximately:

$$\Delta S/P < 4$$

in which $\Delta S$ is the displacement of the element which may be employed to achieve a single pixel shift in the final image, and P is the pixel pitch at the pixel panel or intermediate image. This relationship may apply to single elements or groups of elements. If the left side of the equation is approximately equal to or approximately exceeds 4, the image quality, for example, in terms of MTF, may degrade. Additionally, as previously discussed, the addressed image on the pixel panel may be shifted or warped in the opposite direction of the lens shifted image in order to compensate for the lens-shifted movement.

Figure 3:
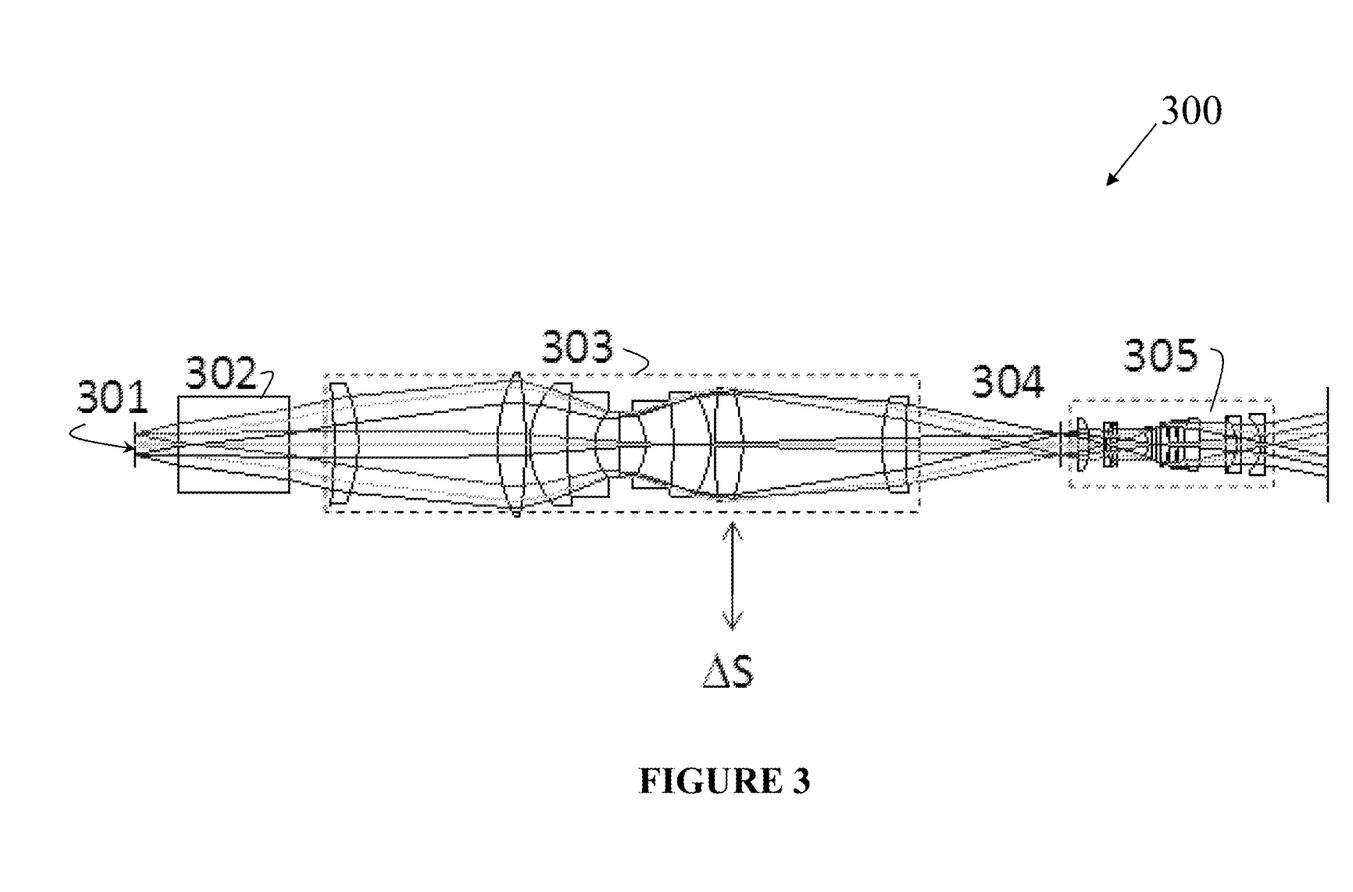
FIG. 3 is a schematic diagram illustrating one embodiment of a relay lens and a projection lens, in accordance with the disclosed principles.

FIG. 3 is a schematic diagram illustrating one embodiment of a compound lens system 300 constructed in accordance with the disclosed principles. Specifically, the lens system 300 in FIG. 3 provides a relay lens 303 and a projection lens 305, and more accurately, a relay lens 303 followed by a projection lens 305 along the optical path created by a light source illuminating a pixel panel 301. The system 300 in FIG. 3 also illustrates illumination and color management optics 302, such as those discussed above with reference to FIG. 1. In the exemplary embodiment of FIG. 3, an element may be displaced ($\Delta S$) in the relay lens 303 to mitigate speckle, similar to the exemplary embodiment discussed above with reference to FIG. 1. The displaced element may be any of the elements in the relay lens 303 that are not included in the central menisci. Alternatively, an element in the projection lens 305 may be displaced to mitigate speckle, similar to the exemplary embodiment discussed above with reference to FIG. 2. In such embodiments, any element which may substantially comply with $\Delta S/P < 4$ in the projection lens 305, as discussed above, may be selected for displacement in order to reduce speckle.

Figure 4:
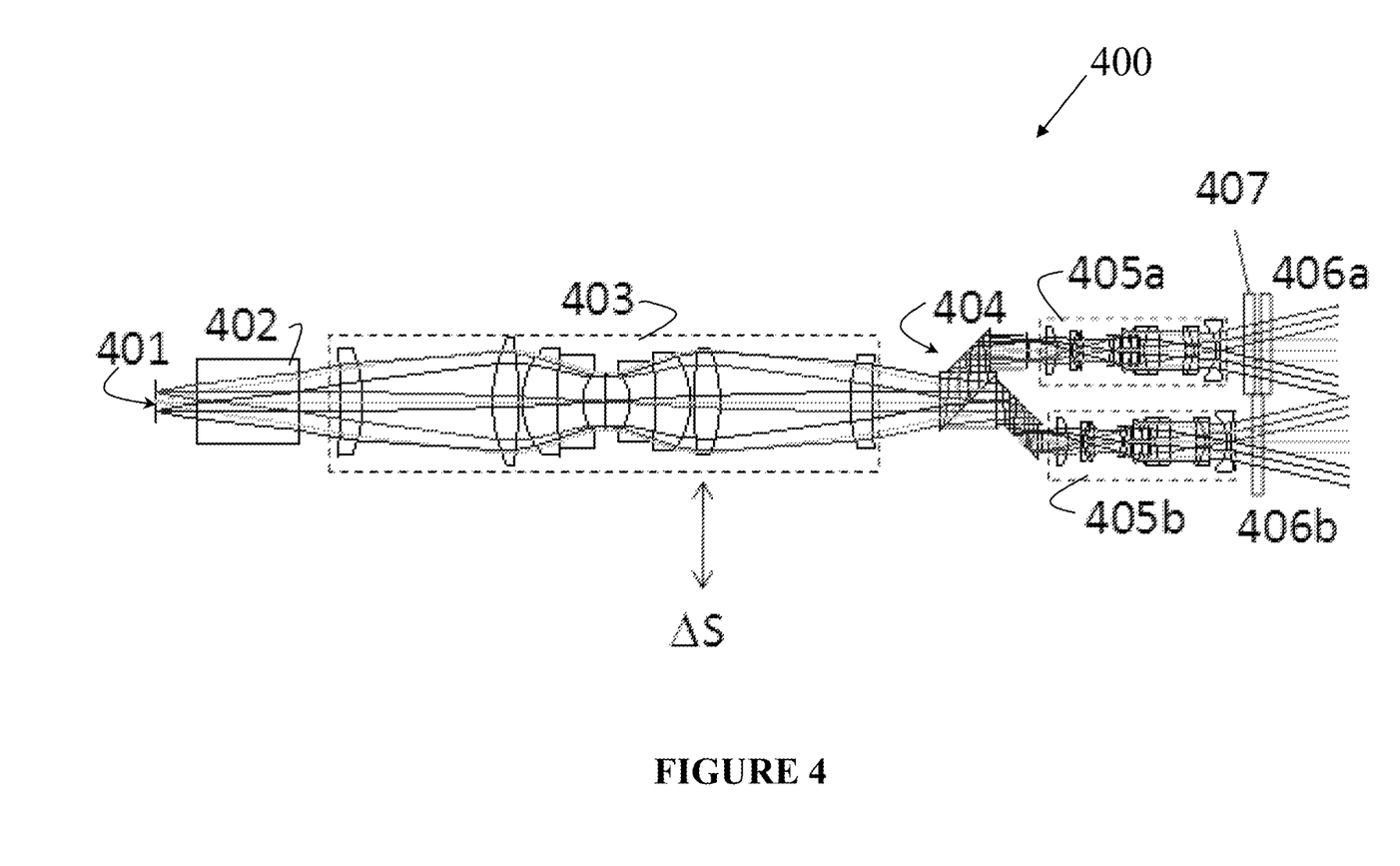
FIG. 4 is a schematic diagram illustrating one embodiment of a stereoscopic optical projection system, including a polarization conversion system and projection lenses, in accordance with the disclosed principles.

FIG. 4 is a schematic diagram illustrating one embodiment of stereoscopic optical display system 400 constructed in accordance with the disclosed principles. Such a system 400 may be utilized for at least stereoscopic or 3D projection applications. The exemplary system 400 includes optional manipulation optics 402, a relay lens 403, a polarization conversion system (PCS) 404, and a pair of projection lenses 405a and 405b. Such an exemplary stereoscopic projection system is similar to systems described in commonly-owned U.S. Provisional Patent Application No. 61/507,959, identified and incorporated by reference above. The stereoscopic display system 400 in FIG. 4 also may include a polarization rotator 407. Polarization rotator 407 may be employed to rotate the polarization state in, for example, the upper optical path, and provides a polarization state matched to the lower optical path's polarization state. The states of polarization are appropriate for manipulation by the passive circular polarizers 406a and 406b, located after each of the projector lenses 405a, 405b. Alternatively, components 406a and 406b may be actively switched polarization modulators when left and right stereoscopic images are displayed in a field sequential manner.

As previously discussed, an element in the relay lens 403 may be displaced to mitigate speckle. The displaced element may be any of the elements not included in the central menisci. Furthermore, an element in each of the projection lenses 405a, 405b may alternatively be displaced to mitigate speckle. Any element which may substantially comply with $\Delta A/P < 4$ in each projection lens 405a, 405b may be selected. Additionally, various types of projection systems may be used including, but not limited to, arc lamp projectors, laser illuminated projectors, and so forth. Further, electronic compensation of an image position on a panel may be employed to offset image shift and may be employed with stereoscopic imagery.

Another embodiment for mitigating speckle in the stereoscopic display system 400 of FIG. 4 can include slightly vibrating the polarizing beam splitter (PBS) of the PCS assembly 404. A slight rotation of the PBS about an axis substantially perpendicular to the optical axis may shift the image on-screen, thus time-averaging the speckle.

Rapid lateral displacement of the projection lenses 405a, 405b may also provide time averaging of the on-screen speckle. To achieve the time averaging of the on-screen speckle, one option may be to move the entire lens, which may be less desirable from a mechanical standpoint, except in cases where the lens is lightweight, such as in a business projector.

For each of the systems in FIG. 3 and FIG. 4, the addressed image on the pixel panel (301, 401) may be shifted or warped in substantially the opposite direction of the lens-shifted image to compensate for the movement, as previously described.

Relay lenses are generally discussed in U.S. Pat. No. 7,317,578, and short BFL projection lenses are generally discussed in *Compact, Wide Range, Telecentric Zoom Lens for DMD Projectors*, which is identified above, and both of these references are herein incorporated by reference in their entirety. Relay and projection lenses may be optimized substantially independently for aberration control, and/or the two lenses can be designed such that opposing aberrations in the two lenses may compensate or substantially null the overall aberrations. Additionally, relay and projection lenses may be designed for higher f-number and higher transmission when lasers are employed as the primary illumination source. Similarly, the PCS anti-reflection, mirror, and polarizing beam splitter coatings may also be optimized for performance with narrowband laser illumination.

Continuing the discussion of the embodiment in FIG. 4, the projection lenses 405a, 405b employed with any of the embodiments described herein may be any type of lens including, but not limited to, a fixed focal length projection lens, a zoom projection lens, and so forth. The relay lens 403 and projection lenses 405a, 405b may have a substantially optimized f-number and transmission for laser illuminated panels. Furthermore, a relay lens 403 and projection lenses 405a, 405b may independently achieve high image quality, substantially without regard to and/or without substantially affecting the performance of any other lens in the system. Moreover, a relay lens 403 and/or projection lenses 405a, 405b may be designed to substantially compensate for and substantially null aberrations present in the other lenses, respectively.

In another embodiment, an optical system constructed in accordance with the disclosed principles may include a projector, a relay lens, and at least one projection lens for projecting imagery. As discussed above, the projection lens may have at least one element which may be displaced substantially orthogonal to the optical axis in-time for shifting an on-screen image and mitigating speckle. Again, the projection lens element(s) may be primarily selected for shifting by choosing element(s) with an approximate displacement of $\Delta S/P<4$ for a single pixel shift on-screen, in which $\Delta S$ may be the displacement and P may be the pixel pitch at the panel or intermediate image. This embodiment may employ any type of projector including, but not limited to, arc lamp projectors, laser illuminated projectors, and so forth. Additionally, electronic compensation of an image position on the pixel panel may be employed to offset image shift and may be used with stereoscopic imagery.

In yet another embodiment, an optical system constructed in accordance with the disclosed principles may again include at least a projector, a relay lens, and at least one projection lens for projecting imagery. However, in these embodiments, the projection lens(es) may be displaced in its entirety substantially orthogonal to the optical axis in-time for shifting the on-screen image and mitigating speckle. Once again, various types of projectors and projections may be employed including, but not limited to, arc lamp projectors, laser illuminated projectors, and so forth. Electronic compensation of an image position on the pixel panel may again be employed to offset image shift and may be used with stereoscopic imagery In yet another embodiment, an optical system constructed in accordance with the disclosed principles may include at least a projector, a relay lens, polarization conversion optics, and two projection lenses for projecting imagery. The polarization conversion optics may include a polarizing beam splitter, which may be rotated or vibrated about an axis substantially perpendicular to the optical axis in-time for shifting the on-screen image and mitigating speckle. As before, such embodiments may employ any type of projector and/or projection system including, but not limited to, arc lamp projectors, laser illuminated projectors, and so forth. Additionally, electronic compensation of an image position on the pixel panel may again be employed to offset image shift and may be used with stereoscopic imagery. Furthermore, the lenses included in this system may be any type of lens including but not limited to, fixed focal length projection lenses, zoom projection lenses, and so forth.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

It should be noted that embodiments of the present disclosure may be used in a variety of optical systems and projection systems. Embodiments may include or work with a variety of projectors, projection systems, optical components, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on, and in a number of computing environments including the Internet, intranets, local area networks, wide area networks and so on.

Before proceeding to the disclosed embodiments in detail, it should be understood that exemplary embodiments disclosed herein are not limited in application or creation to the details of the particular arrangements shown, because such embodiments are capable of other variations. Moreover, aspects of the embodiment may be set forth in different combinations and arrangements to define embodiments unique in their own right. Also, the terminology used herein is for the purpose of description and not of limitation.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. An optical system, comprising:
    a light source for illuminating a pixel panel;
    a relay lens in an image path of the pixel panel and light source configured to relay an intermediate image of the pixel panel; and
    at least one projection lens for projecting the intermediate image received from the relay lens onto a screen, wherein at least a portion of the relay lens or the projection lens is translatable substantially orthogonal to an optical axis of the optical system in-time to shift a position of the projected imagery on the screen.

2. An optical system according to claim 1, wherein a single lens element within the relay lens is translatable by a portion of a pixel size of the pixel panel to provide approximately a half-pixel image shift in the projected imagery on the screen.

3. An optical system according to claim 1, wherein the relay lens is a double-Gauss system comprising two outer lenses and two inner cemented menisci, symmetrically arranged around an aperture.

4. An optical system according to claim 1, wherein the optical system is a stereoscopic display system comprising two projection lenses, and wherein at least one lens element in each of the projection lenses is translatable in-time to shift a position of the projected imagery on the screen.

5. An optical system according to claim 1, wherein the optical system is a stereoscopic display system comprising two projection lenses and a polarization conversion system, wherein a polarizing beam splitter of the polarization conversion system is rotatable about an axis substantially perpendicular to the optical axis in-time to shift a position of the projected imagery on the screen thereby mitigating imagery speckle.

6. An optical system according to claim 1, wherein the light source is a laser light source.

7. An optical system according to claim 1, wherein the projection lens in its entirety is translatable in-time to shift a position of the projected imagery on the screen.

8. An optical system according to claim 1, further comprising an electronic addressing sub-system configured to shift the imagery on the pixel panel using electronic addressing in a direction opposite of the shift provided by the translation of the at least one portion.

9. An optical system according to claim 1, further comprising an image warping sub-system configured to shift the imagery on the pixel panel using image warping in a direction opposite of the shift provided by the translation of the at least one portion.

10. An optical system according to claim 1, wherein at least a portion of the relay lens or the projection lens is translatable substantially orthogonal to an optical axis of the optical system in-time to shift a position of the projected imagery on the screen thereby mitigating imagery speckle.

11. A method for mitigating imagery speckle in an optical system, the method comprising:
    illuminating imagery on a pixel panel with a light source;
    relaying an intermediate image of the pixel panel using a relay lens positioned in an image path generated by the light source;
    projecting the intermediate image received from the relay lens with at least one projection lens onto a screen; and
    shifting a position of the projected imagery on the screen by translating at least a portion of the relay lens or the projection lens substantially orthogonal to an optical axis of the optical system in-time.

12. A method according to claim 11, wherein shifting a position of the projected imagery on the screen comprises translating a single lens element within the relay lens by a portion of a pixel size of the pixel panel to provide an approximately half-pixel image shift in the projected imagery on the screen.

13. A method according to claim 11, wherein the relay lens is a double-Gauss system comprising two outer lenses and two inner cemented menisci, symmetrically arranged around an aperture.

14. A method according to claim 11, wherein the optical system is a stereoscopic display system comprising two projection lenses, and wherein shifting a position of the projected imagery on the screen comprises translating at least one lens element in each of the projection lenses in-time to shift a position of the projected imagery on the screen.

15. A method according to claim 11, wherein the optical system is a stereoscopic display system comprising two projection lenses and a polarization conversion system, and wherein shifting a position of the projected imagery on the screen further comprises rotating a polarizing beam splitter of the polarization conversion system about an axis substantially perpendicular to the optical axis in-time to shift a position of the projected imagery on the screen thereby mitigating imagery speckle.

16. A method according to claim 11, wherein the light source is a laser light source.

17. A method according to claim 11, wherein shifting a position of the projected imagery on the screen comprises translating the projection lens in its entirety substantially orthogonal to an optical axis of the optical system in-time to shift a position of the projected imagery on the screen.

18. A method according to claim 11, further comprising shifting the imagery on the pixel panel in a direction opposite of the shift provided by the translation of the at least one portion.

19. A method according to claim 18, wherein shifting the imagery in a direction opposite of the shift provided by the translation of the at least one portion comprises using electronic addressing or image warping of the imagery on the pixel panel.

20. A method according to claim 11, further comprising shifting a position of the projected imagery on the screen by translating at least a portion of the relay lens or the projection lens substantially orthogonal to an optical axis of the optical system in-time to thereby mitigating imagery speckle.

21. A stereoscopic optical projection system, comprising:
a laser light source for illuminating a pixel panel;
a relay lens in an image path generated by the pixel panel and the light source configured to relay an intermediate image of the pixel panel; and
a first and second projection lens for projecting stereoscopic intermediate imagery received from the relay lens onto a screen, wherein a position of the projected stereoscopic imagery on the screen is moveable in-time.

22. A stereoscopic optical projection system according to claim 21, wherein at least one lens element within the relay lens is translatable substantially orthogonal to an optical axis of the optical system in-time to shift the position of the projected stereoscopic imagery on the screen.

23. A stereoscopic optical projection system according to claim 21, wherein at least one lens element within each of the projection lenses is translatable substantially orthogonal to an optical axis of the optical system in-time to shift the position of the projected stereoscopic imagery on the screen.

24. A stereoscopic optical projection system according to claim 21, wherein the relay lens is a double-Gauss system comprising two outer lenses and two inner cemented menisci, symmetrically arranged around an aperture.

25. A stereoscopic optical projection system according to claim 21, wherein the optical system further comprises a polarization conversion system for providing the stereoscopic imagery to the projection lenses, wherein a polarizing beam splitter of the polarization conversion system is rotatable about an axis substantially perpendicular to the optical axis in-time to shift the position of the projected imagery on the screen.

26. A stereoscopic optical projection system according to claim 21, wherein the projection lens in its entirety is translatable in-time to shift the position of the projected stereoscopic imagery on the screen.

27. A stereoscopic optical projection system according to claim 21, further comprising an electronic addressing sub-system configured to shift the imagery on the pixel panel using electronic addressing in a direction opposite of the shift of the position of the projected stereoscopic imagery on the screen.

28. A stereoscopic optical projection system according to claim 21, further comprising an image warping sub-system configured to shift the imagery on the pixel panel using image warping in a direction opposite of the shift of the position of the projected stereoscopic imagery on the screen.

29. A stereoscopic optical projection system according to claim 21, wherein the position of the projected stereoscopic imagery on the screen is moveable in-time thereby mitigating imagery speckle.

* * * * *